(12) United States Patent
Seong et al.

(10) Patent No.: US 9,643,488 B2
(45) Date of Patent: May 9, 2017

(54) MANAGEMENT SYSTEM FOR REFUELING AND CHARGING OF PLUG-IN HYBRID ELECTRIC VEHICLE

(71) Applicant: Hyundai Motor Company, Seoul (KR)

(72) Inventors: Jae Yong Seong, Gyeonggi-Do (KR); Young Cheol Koh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/929,268

(22) Filed: Oct. 31, 2015

(65) Prior Publication Data

US 2017/0008393 A1   Jan. 12, 2017

(30) Foreign Application Priority Data

Jul. 9, 2015   (KR) .................. 10-2015-0097895

(51) Int. Cl.

| | |
|---|---|
| *B60L 9/00* | (2006.01) |
| *H02J 7/00* | (2006.01) |
| *B60K 15/05* | (2006.01) |
| *B60W 20/00* | (2016.01) |
| *B60L 11/18* | (2006.01) |
| *B60K 15/03* | (2006.01) |

(52) U.S. Cl.
CPC ............ *B60K 15/05* (2013.01); *B60L 11/182* (2013.01); *B60L 11/1818* (2013.01); *B60W 20/00* (2013.01); *H02J 7/0047* (2013.01); *B60K 2015/03203* (2013.01); *B60K 2015/0538* (2013.01); *B60L 2240/28* (2013.01); *B60Y 2200/92* (2013.01); *B60Y 2306/13* (2013.01); *B60Y 2400/90* (2013.01)

(58) Field of Classification Search
USPC ............................................. 701/22; 320/109
See application file for complete search history.

(56) References Cited

U.S. PATENT DOCUMENTS 8,890,475 B1 * 11/2014 Becker ................ B60L 11/1827
180/65.29
2007/0256737 A1 * 11/2007 Janarthanam .......... B60H 1/008
137/386

(Continued)

FOREIGN PATENT DOCUMENTS

JP   2009-138384 A   6/2009
JP   2013-230016 A   11/2013

(Continued)

*Primary Examiner* — Thomas G Black
*Assistant Examiner* — Tyler Paige
(74) *Attorney, Agent, or Firm* — Mintz Levin Cohn Ferris Glovsky and Popeo, P.C.; Peter F. Corless (57) ABSTRACT

A system for managing refueling and charging of a plug-in hybrid vehicle is provided to prevent charging from being performed simultaneously with refueling to prevent accidents attributable to the occurrence of gas fumes and static electricity. The system includes a plurality of input units configured to receive instructions for refueling and charging a battery. A fueling/charging controller is configured to determine whether a process for refueling and a process for charging the battery are progressing and to start a process that corresponds to the instruction input from any one of the plurality of input units when neither the process for refueling nor the process for charging the battery is progressing.

19 Claims, 4 Drawing Sheets

(56) References Cited

U.S. PATENT DOCUMENTS

| | | | | |
|---|---|---|---|---|
| 2011/0000726 | A1* | 1/2011 | Tanaka | B60K 6/48 |
| | | | | 180/65.265 |
| 2012/0293122 | A1* | 11/2012 | Murawaka | B60L 11/1816 |
| | | | | 320/109 |
| 2013/0040486 | A1* | 2/2013 | Kurumizawa | H01R 13/639 |
| | | | | 439/350 |
| 2013/0241479 | A1* | 9/2013 | Wright, Jr. | H02H 5/10 |
| | | | | 320/109 |
| 2014/0152255 | A1* | 6/2014 | Lovett | H02J 7/0029 |
| | | | | 320/109 |
| 2014/0207362 | A1* | 7/2014 | Shimotani | G08G 1/13 |
| | | | | 701/119 |
| 2016/0171797 | A1* | 6/2016 | Kim | G07C 5/0808 |
| | | | | 701/29.2 |

FOREIGN PATENT DOCUMENTS

| | | |
|---|---|---|
| KR | 10-2001-0019142 A | 3/2001 |
| KR | 10-2010-0079338 | 7/2010 |
| KR | 10-2011-0002970 | 1/2011 |
| KR | 10-2012-0026882 | 3/2012 |
| KR | 10-2014-0076552 A | 6/2014 |

\* cited by examiner

MANAGEMENT SYSTEM FOR REFUELING AND CHARGING OF PLUG-IN HYBRID ELECTRIC VEHICLE

CROSS REFERENCE TO RELATED APPLICATION

The present application claims priority to Korean Patent Application No. 10-2015-0097895, filed Jul. 9, 2015, the entire contents of which is incorporated herein for all purposes by this reference.

BACKGROUND

Field of the Invention

The present invention relates to a system for managing refueling and charging of a plug-in hybrid electric vehicle, which prevents charging from being performed during refueling, to prevent accidents attributable to the occurrence of gas fumes and static electricity.

Description of the Related Art

A plug-in hybrid vehicle is a type of a hybrid vehicle that has both an internal combustion engine, which produces driving power by burning fossil fuel, and an electric motor, which produces driving power using electric energy. A general hybrid vehicle converts the driving power of the combustion engine to charge a high-voltage battery, which supplies electric power to the electric motor. However, the plug-in hybrid vehicle has an additional device for receiving electric power by being directly connected to an external power source, and thus the high-voltage battery may be charged at energy stations, in addition to being charged by the conversion of the driving power produced by the combustion engine.

Meanwhile, to encourage the use of electric vehicles, regulations have been established for gas stations to also provide electric vehicle charging facilities. Under such regulated conditions, plug-in hybrid vehicles may refuel and charge a high-voltage battery for the electric motor at the same location.

Currently, for refueling and charging a battery for currently developed plug-in hybrid vehicles, fuel may be supplied regardless of the power conditions of the vehicle, such as an ignition (IG) OFF state, accessory (ACC) state, IG ON state, and IDLE state. Also, in the case of charging, slow charging is possible under the power conditions except for the IDLE state. However, additional safety devices are not applied for the case in which the plug-in hybrid vehicle is refueled simultaneously with slow charging.

When a process for refueling and a process for charging a battery are performed simultaneously when an additional safety device is not prepared as described above, the increase in gas fumes in gas stations (e.g., during summer or warm temperature conditions) and the increase in static electricity (e.g., during winter or cold temperature/dry conditions) may cause fire accidents and adversely affect electric vehicle charging facilities, thus leading to injuries or casualties.

The foregoing is intended merely to aid in the understanding of the background of the present invention, and is not intended to mean that the present invention falls within the purview of the related art that is already known to those skilled in the art.

SUMMARY

Accordingly, the present invention provides a system for managing refueling and charging of a plug-in hybrid electric vehicle, which prevents charging from being performed during fueling to reduce risk of accidents attributable to the occurrence of gas fumes and static electricity.

According to one aspect of the present invention, a system for managing refueling and charging of a plug-in hybrid vehicle may include: a plurality of input units configured to receive an instruction for refueling and an instruction for charging a battery; and a fueling/charging controller configured to determine whether a process for refueling and a process for charging the battery are progressing when an instruction is input from any one of the plurality of input units, and configured to start a process that corresponds to the instruction, based on input from any one of the plurality of input units, when neither the process for refueling and nor the process for charging the battery is progressing.

In an exemplary embodiment of the present invention, the fueling/charging controller may be configured to provide a warning that the process for refueling and the process for charging the battery is progressing in response to determining that the process for refueling or the process for charging the battery is progressing. In addition, the input units may include a first input unit configured to receive an instruction for opening a fuel tank door, and a second input unit configured to receive an instruction for opening a cable charging connector door to connect a power cable for supplying charging power to the battery.

Further, the fueling/charging controller may be configured to determine whether the fuel tank door and the cable charging connector door are open when an instruction is input from the first input unit, and may be configured to open the fuel tank door in response to determining that neither the fuel tank door nor the cable charging connector door is open. The fueling/charging controller may also be configured to determine whether the fuel tank door and the cable charging connector door are open when an instruction is input from the second input unit, and may be configured to open the cable charging connector door in response to determining that neither the fuel tank door nor the cable charging connector door is open.

In addition, the fueling/charging controller may be configured to determine whether the fuel tank door and the cable charging connector door are open when an instruction is input from the first input unit or the second input unit, determine whether fuel is being supplied when determining that the fuel tank door is open, and determine whether the battery is being charged when determining that the cable charging connector is open.

The fueling/charging controller may then be configured to provide a warning that fuel is being supplied in response to determining that fuel is being supplied, and may be configured to provide or output a warning that the fuel tank door is open in response to determining that fuel is not being supplied. In particular, the fueling/charging controller may be configured to provide a warning that the battery is being charged in response to determining that the battery is being charged, and provide a warning that the cable charging connector door is open in response to determining that the battery is not being charged.

Moreover, the input units may include a first input unit configured to receive an instruction for opening a fuel tank door, and a second input unit configured to receive an instruction for starting an operation of a wireless power reception unit, which is wirelessly supplied with battery charging power. The fueling/charging controller may be configured to determine whether the fuel tank door is open and detect an input state of the second input unit, when an instruction is input from the first input unit; and may be configured to open the fuel tank door in response to determining that the fuel tank door is not open and that an input is not generated in the second input unit.

In an exemplary embodiment of the present invention, the fueling/charging controller may be configured to determine whether the fuel tank door is open and whether the wireless power reception unit is operating, when an instruction is input from the second input unit; and may be configured to start an operation of the wireless power reception unit in response determining that the fuel tank door is not open (e.g., is closed) and that the wireless power reception unit is not operating. The fueling/charging controller may be configured to determine whether the fuel tank door is open and detect an input state of the second input unit, when an instruction is input from the first input unit; determine whether fuel is being supplied in response to determining that the fuel tank door is open; and determine whether the wireless power reception unit is operating in response to determining that an input is generated in the second input unit.

Further, the fueling/charging controller may be configured to output a warning that fuel is being supplied in response to determining that fuel is being supplied, and output a warning that the fuel tank door is open in response determining that fuel is not being supplied. The fueling/charging controller may further be configured to output a warning that the battery is being wirelessly charged in response to determining that the wireless power reception unit is operating, and output a warning that an input is generated in the second input unit in response to determining that the wireless power reception unit is not operating.

In addition, the fueling/charging controller may be configured to determine whether the fuel tank door is open and whether the wireless power reception unit is operating, when an instruction is input from the second input unit; determine whether fuel is being supplied in response to determining that the fuel tank door is open, output a warning that fuel is being supplied in response to determining that fuel is being supplied, and output a warning that the fuel tank door is open in response to determining that fuel is not being supplied; and output a warning that the battery is wirelessly being charged when the wireless power reception unit is operating.

Furthermore, the input units may include a first input unit configured to receive an instruction for opening a fuel tank door, a second input unit configured to receive an instruction for opening a cable charging connector door to connect a power cable for supplying charging power to the battery, and a third input unit configured to receive an instruction for starting an operation of a wireless power reception unit, which is wirelessly supplied with battery charging power. The fueling/charging controller may be configured to determine whether the fuel tank door and the cable charging connector door are open and detect an input state of the third input unit, when an instruction is input from the first input unit; and may be configured to open the fuel tank door in response to determining that neither the fuel tank door nor the cable charging connector door is open and that an input is not generated in the third input unit.

The fueling/charging controller may additionally be configured to determine whether the fuel tank door and the cable charging connector door are open and detect an input state of the third input unit, when an instruction is input from the second input unit; and may be configured to open the cable charging connector door in response to determining that neither the fuel tank door nor the cable charging connector door is open and that an input is not generated in the third input unit. The fueling/charging controller may then be configured to determine whether the fuel tank door and the cable charging connector door are open and whether the wireless power reception unit is operating, when an instruction is input from the third input unit; and start an operation of the wireless power reception unit in response to determining that neither the fuel tank door nor the cable charging connector door is open and that the wireless power reception unit is not operating.

The fueling/charging controller may also be configured to determine whether the fuel tank door and the cable charging connector door are open and detect an input state of the third input unit, when an instruction is input from the first input unit; determine whether fuel is being supplied in response to determining that the fuel tank door is open; determine whether the battery is being charged in response to determining that the cable charging connector door is open; and determine whether the wireless power reception unit is operating in response to determining that an input is generated in the third input unit.

A warning may then be output to indicate that fuel is being supplied in response to determining that fuel is being supplied, and a warning to indicate that the fuel tank door is open in response to determining that fuel is not being supplied. A warning may also be output to indicate that the battery is being charged when determining that the battery is being charged; a warning to indicate that the cable charging connector door is open when the battery is not being charged; and a warning to indicate that the battery is being wirelessly charged in response to determining that the wireless power reception unit is operating.

Then the fueling/charging controller may be configured to determine whether the fuel tank door and the cable charging connector door are open and detect an input state of the third input unit, when an instruction is input from the second input unit; determine whether fuel is being supplied in response to determining that the fuel tank door is open; determine whether the battery is being charged in response to determining that the cable charging connector door is open; and determine whether the wireless power reception unit is operating in response to determining that an input is generated in the third input unit.

In an exemplary embodiment of the present invention, the fueling/charging controller may be configured to output a warning that fuel is being supplied in response to determining that fuel is being supplied, and a warning that the fuel tank door is open in response to determining that fuel is not being supplied. The fueling/charging controller may also be configured to output a warning that the battery is being charged in response to determining that the battery is being charged; a warning that the cable charging connector door is open in response to determining that the battery is not being charged; and a warning that the battery is wirelessly being charged in response to determining that the wireless power reception unit is operating.

Additionally, the fueling/charging controller may be configured to determine whether the fuel tank door and the cable charging connector door are open and whether the wireless power reception unit is operating, when an instruction is input from the third input unit; determine whether fuel is being supplied in response to determining that the fuel tank door is open, output a warning that fuel is being supplied in response determining that fuel is being supplied, and output a warning that the fuel tank door is open in response to determining that fuel is not being supplied; determine whether the battery is being charged in response to determining that the cable charging connector door is open, and output a warning that the cable charging connector door is open in response to determining that the battery is not being charged; and output a warning that the battery is wirelessly being charged in response to determining that the wireless power reception unit is operating.

Since the present invention prevents charging from being performed during refueling of a plug-in hybrid vehicle, it may be possible to prevent accidents, such as fire or explosion attributable to gas fumes, which may be generated during refueling, and static electricity, which may be generated during charging. Particularly, according to the present invention, after a driver provides an input for starting a process for refueling or a process for charging a battery, various environment conditions and other conditions related to refueling and charging of a vehicle may be detected, whereby performing the process for refueling and the process for charging the battery simultaneously may be more completely prevented. Additionally, according to the present invention, preventing charging from being performed during refueling may be applied to vehicles that use a wired charging method through power cables and also to vehicles that use a wireless charging method and vehicles that use a combination of wired and wireless charging methods.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a system for managing refueling and charging of a plug-in hybrid vehicle according to an embodiment of the present invention will be described in detail with reference to the accompanying drawings.

Figure 1:
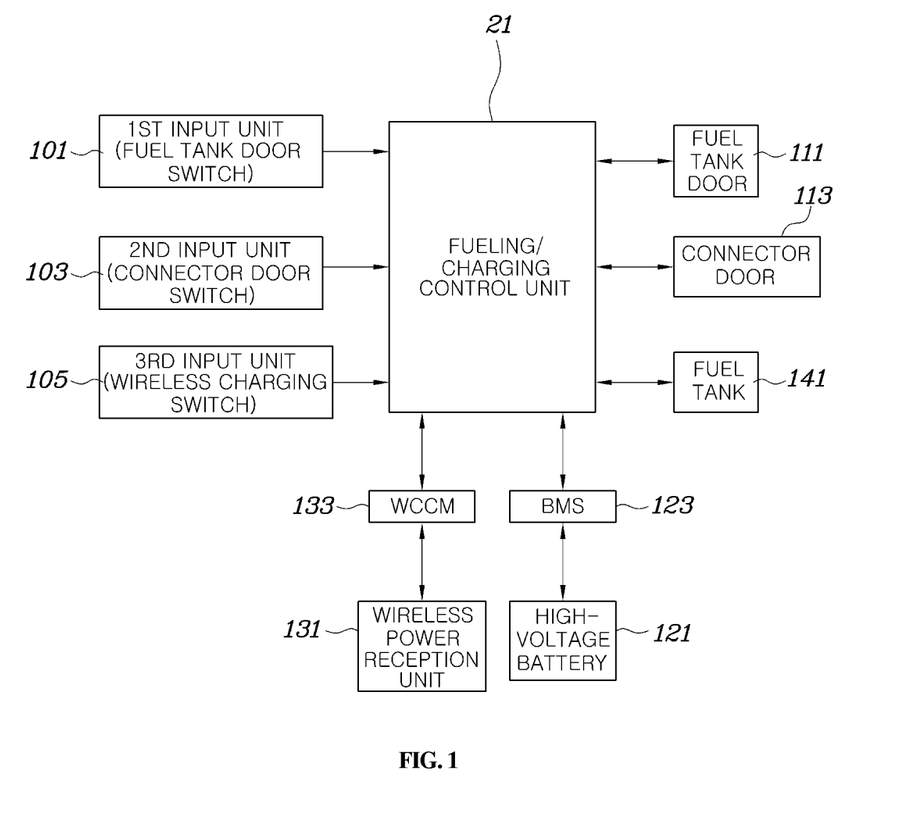
FIG. 1 is a block diagram of a system for managing refueling and charging of a plug-in hybrid vehicle according to an exemplary embodiment of the present invention.

FIG. 1 is a block diagram of a system for managing refueling and charging of a plug-in hybrid vehicle according to an exemplary embodiment of the present invention. As illustrated in FIG. 1, a system for managing refueling and charging of a plug-in hybrid vehicle according to an exemplary embodiment of the present invention may include: a plurality of input units 101, 103, and 105 configured to receive instructions (e.g., receive user input) for refueling or charging a battery; and a fueling/charging controller 21 configured to determine whether a process for refueling and a process for charging a battery are progressing when an instruction is input from any one of the plurality of input units 101, 103, and 105 (e.g., in response to receiving a user input), and to start a process that corresponds to the instruction input from any one of the plurality of input units when neither the process for refueling nor the process for charging the battery is progressing or ongoing.

The plurality of input units 101, 103, and 105 may be configured to receive instructions from a user for performing the process for refueling and the process for charging a battery. The plurality of input units 101, 103, and 105 may include various switches arranged for starting the process for refueling and the process for charging a battery. For example, the plurality of input units 101, 103, and 105 may include a fuel tank door switch 101 used to open a fuel tank door 111, a cable charging connector door switch 103 used to open the door 113 of a connector to which a power cable is connected for receiving battery charging power from an external power source, and a wireless charging switch 105 for receiving an instruction to start the operation of a wireless power reception unit 131. Hereinbelow, each of the input units may be referred to as first to third input units.

When an input is generated from each of the input units 101, 103, and 105, the fueling/charging controller 21 may be configured to determine whether a process for refueling and a process for charging a battery are progressing before starting the refueling and charging of the battery. Particularly, the process for refueling may be understood as a process that includes a series of events for supplying fuel for driving an internal combustion engine. For example, the process for refueling may be started by opening the fuel tank door 111 and may include injecting the fuel to the fuel tank 141.

Similarly, the process for charging a battery may be understood as a process that includes a series of events for receiving power for charging the battery via a wired or wireless charging method. For example, for a wired charging method, the charging of a battery may include opening the cable charging connector door 113 to connect a power cable for charging the battery and receiving battery charging power via the power cable connected to the charging connector. In the wired charging method, the charging of a battery may start with opening the cable charging connector door. In the wireless charging method, the charging of a battery may be started by starting the wireless power reception unit 131 configured to receive power via the wireless charging method.

When the wireless charging switch 105 receives an input, the operation of the wireless power reception unit 131 may be started by a wireless charging control module (WCCM) 133 (e.g., another controller). The wireless power reception unit 131 may include a secondary coil configured to convert a signal transmitted as a form of a magnetic field into an electric signal, and various circuits configured to convert the power induced by the secondary coil. To start the wireless power reception unit 131, the WCCM 133 may be configured to determine whether to start the operation of the wireless power reception unit 131 based on various surrounding factors.

In response to receiving an input from the plurality of input units 101, 103, and 105, the fueling/charging controller 21 may be configured to determine whether a refueling or a charging of a battery is progressing (e.g., ongoing, underway, etc.) before starting a process that corresponds to the input of the relevant input unit 101, and start the process that corresponds to the input of the relevant input unit 101 when neither the refueling nor the charging of the battery is progressing. For example, the fueling/charging controller 21 may be configured to determine whether the fuel tank door 111 is open, whether fuel is injected into the fuel tank, whether the cable charging connector door 131 is open, whether the battery is being charged, whether the operation of the wireless power reception unit 131 is started, and the like. Then, according to the result of the determination, the fueling/charging controller 21 may be configured to determine whether to start the process that corresponds to the input of the relevant input unit 101.

In FIG. 1, the fueling/charging controller 21 is illustrated as a single block, but it may be understood as including various control factors applied to a practical plug-in hybrid vehicle. For example, the fueling/charging controller 21 may include: a body control module (BCM) configured to receive signals that correspond to the inputs from the input units 101, 103, and 105, and calculate and instruct various control algorithms in response to the inputs; a smart junction box (SJB) configured to provide or output relay signals for opening a fuel tank door 111 or cable charging connector door 113, generate the opening state information of the doors 111 and 113 by detecting the relay signals, and transmit the information to the BCM; a cluster configured to receive information regarding the fuel amount within the fuel tank 141 or receive information regarding the battery charge amount from the battery management system (BMS) 123; and an integrated gateway power module (IGPM) configured to transmit control instructions to the BMS 123 or wireless charging control module 133, and receive various pieces of information regarding the battery state and wireless charging process.

Additionally, in response to determining that the refueling or the charging of a battery is progressing, the fueling/charging controller 121 may be configured to output (e.g., provide) a warning regarding the progression. The warning may be represented by displaying a warning label or a warning symbol, or by outputting a warning sound to alert a driver or user of the progression.

The system for managing refueling and charging of a plug-in hybrid vehicle according to an exemplary embodiment of the present invention may be applied to a vehicle supplied with fuel and using a wired charging method, a vehicle supplied with fuel and using a wireless charging method, and a vehicle supplied with fuel and using wired and wireless charging methods. Hereinafter, various exemplary embodiments according to the charging methods will be described.

Wired Charging Method

Figure 2:
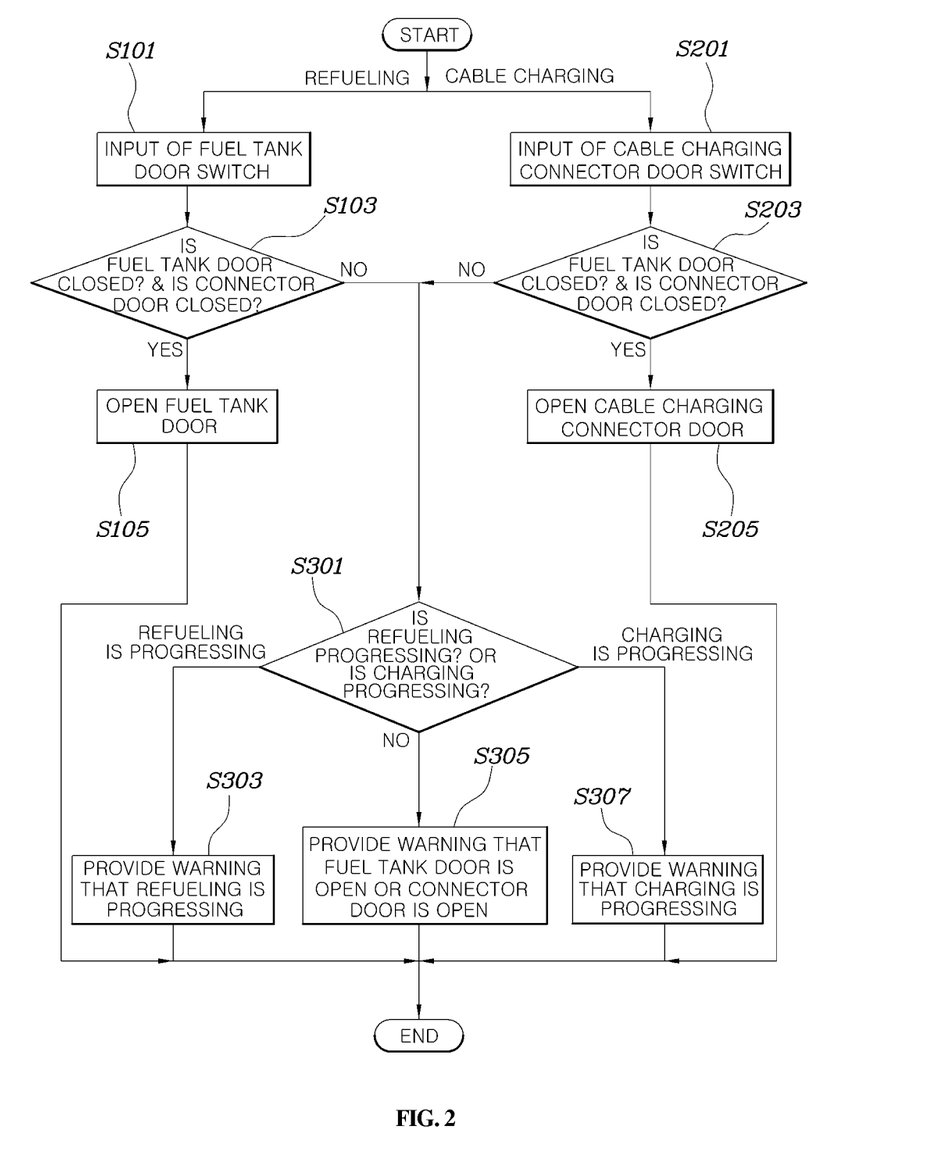
FIG. 2 is a flowchart illustrating a system for managing refueling and charging of a plug-in hybrid vehicle according to an exemplary embodiment of the present invention applied to a vehicle that uses a wired charging method.

FIG. 2 is a flowchart illustrating the system for managing refueling and charging of a plug-in hybrid vehicle according to an exemplary embodiment of the present invention applied to a vehicle that uses a wired charging method. In the exemplary embodiment of FIG. 2, the input unit may include a fuel tank door switch 101, configured to receive an instruction (e.g., a user input) for opening a fuel tank door, and a cable charging connector door switch 103, configured to receive an instruction for opening a cable charging connector door to connect a power cable for supplying power to a battery.

First, when an instruction is input from the fuel tank door switch 101 (S101), the fueling/charging controller 21 may be configured to determine whether the fuel tank door 111 and the cable charging connector door 113 are open (S103). Then, in response to determining that neither the fuel tank door 111 nor the cable charging connector door 113 is open, the fueling/charging controller 21 may be configured to open the fuel tank door 111 (S105) to enable refueling.

Meanwhile, the fueling/charging controller 21 may be configured to determine whether fuel is being supplied using a level sensor within the fuel tank 141 (S301) in response to determining that the fuel tank door 111 is open, and may be configured to output a warning indicating that fuel is being supplied (S303) in response to determining that fuel is being supplied. In response to determining that fuel is not being supplied, the fueling/charging controller 21 may be configured to output a warning indicating that the fuel tank door 111 is open (S305). Accordingly, a driver may be warned that the fuel tank door 111 is open before providing an input through the fuel tank door switch 101 to provide a refuel instruction.

Additionally, when the fueling/charging controller 21 determines at S103 that the cable charging connector door 113 is open, the fueling/charging controller may be configured to determine whether charging of a high-voltage battery 121 is progressing using a battery management system 123 (S301), and may be configured to output a warning that the battery is being charged (S307) in response to determining that the charging is progressing. In response to determining at step S301 that charging of the battery 121 is not progressing, the fueling/charging controller 21 may be configured to output a warning that the cable charging connector door 113 is open (S305). Accordingly, the driver may be warned that the cable charging connector door 113 is open although the charging is not progressing.

Further, when an instruction is input from the cable charging connector door switch 103 (S201), the fueling/charging controller 21 may be configured to determine whether the fuel tank door 111 and the cable charging connector door are open (S203). In response to determining at step S203 that neither the fuel tank door 111 nor the cable charging connector door 113 is open, the fueling/charging controller 21 may be configured to open the cable charging connector door 113 (S205) to enable the connecting of the power cable.

Meanwhile, the fueling/charging controller 21 may be configured to determine whether fuel is being supplied using the level sensor within the fuel tank 141 (S301) in response to determining at step S203 that the fuel tank door 111 is open, and may be configured to output a warning that fuel is being supplied in response to determining that fuel is being supplied (S303). In addition, in response to determining at step S301 that fuel is not being supplied, the fueling/charging controller 21 may be configured to output a warning that the fuel tank door 111 is open (S305). Accordingly, the driver may be warned that the fuel tank door 111 is open although refueling is not progressing.

Additionally, the fueling/charging controller 21 may be configured to determine whether charging of the high-voltage batter 121 is progressing (S301) in response to determining at step S203 that the cable charging connector door 113 is open, and may be configured to output a warning that the battery is being charged (S307) in response to determining that the battery charging is progressing. In response to determining at step S301 that the battery 121 is not being charged, the fueling/charging controller 21 may be configured to output a warning that the cable charging connector door 113 is open (S305). Thus, the driver may be warned that the cable charging connector door 113 is open before generating an input via the cable charging connector door switch 103 to charge the battery.

According to the exemplary embodiment of the present invention as described above, in a vehicle that is supplied with fuel and uses a wired charging method, when a user generates an input to refuel or to charge a battery, the operations related to the process for refueling and wired charging, may be detected before the corresponding process is started, whereby it may be possible to prevent a dangerous situation in which refueling is performed simultaneously with the battery charging.

Wireless Charging Method

Figure 3:
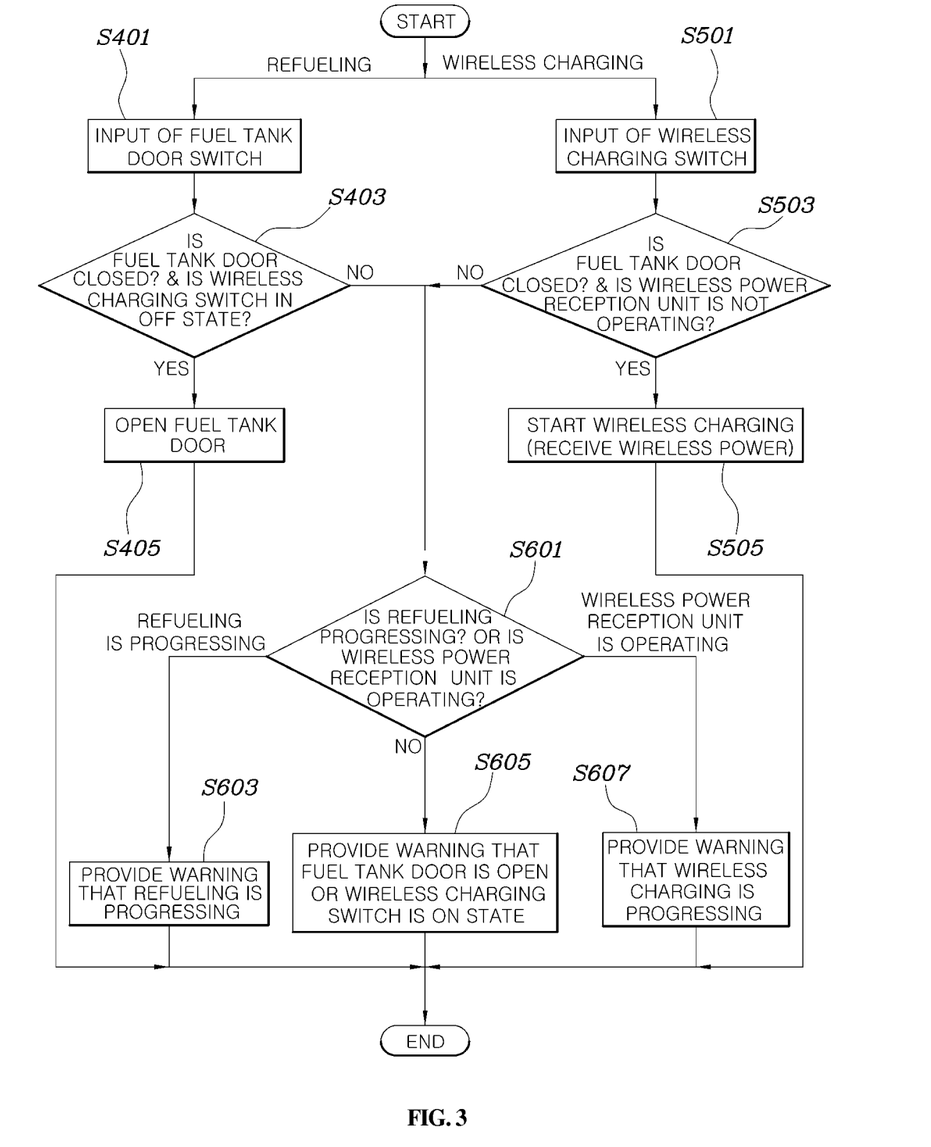
FIG. 3 is a flowchart illustrating a system for managing refueling and charging of a plug-in hybrid vehicle according to an exemplary embodiment of the present invention applied to a vehicle that uses a wireless charging method.

FIG. 3 is a flowchart illustrating the system for managing refueling and charging of a plug-in hybrid vehicle according to an exemplary embodiment of the present invention applied to a vehicle that uses a wireless charging method. In the exemplary embodiment of FIG. 3, the input units may include a fuel tank door switch 101, configured to receive an instruction for opening a fuel tank door, and a wireless charging switch 105, configured to receive an instruction for starting the operation of a wireless power reception unit 131 to wirelessly charge a battery.

First, when an instruction is input from the fuel tank door switch 101 (e.g., by receiving a user input) (S401), the fueling/charging controller 21 may be configured to determine the input state of the wireless charging switch 105 and whether the fuel tank door 111 is open (S403). In response to determining at step S403 that the fuel tank door 111 is not open and the wireless charging switch 105 is in OFF state, the fueling/charging controller 21 may be configured to open the fuel tank door 111 (S405) to enable refueling.

Meanwhile, the fueling/charging controller 21 may be configured to determine whether fuel is being supplied using a level sensor within a fuel tank 141 (S601) in response to determining at step S403 that the fuel tank door 111 is open, and may be configured to output a warning that fuel is being supplied (S603) in response to determining that refueling is progressing. In particular, in response to determining at step S601 that fuel is not being supplied, the fueling/charging controller 21 may be configured to output a warning that the fuel tank door 111 is open (S605) to warn a driver that the fuel tank door 111 is open an input is received via the fuel tank door switch 101 to supply fuel.

Additionally, when the fueling/charging controller 21 determines at S601 that the wireless charging switch 105 is in ON state, whether the wireless power reception unit 131 is operating may be determined (S601), and the fueling/charging controller 21 may be configured to output a warning that the wireless charging is progressing (S607) in response to determining that the wireless power reception unit 131 is operating. In response to determining at step S601 that wireless power reception unit 131 is not operating, the fueling/charging controller 21 may be configured to output a warning that the wireless charging switch 105 is in ON state (S605). Accordingly, the driver may be warned that the wireless charging switch 105 is in ON state although the wireless charging is not progressing.

Further, when an instruction is input from the wireless charging switch 105 (S501), the fueling/charging controller 21 may be configured to determine whether the fuel tank door 111 is open and whether the wireless power reception unit 131 is operating (S503). In response to determining at step S503 that the fuel tank door 111 is not open and the wireless power reception unit 131 is not operating, the fueling/charging controller 21 may be configured to operate the wireless power reception unit 131 to start its operation (S505). In other words, the fueling/charging controller 21 may be configured to operate the wireless charging control module 133 to determine whether various conditions for wireless charging are satisfied, and may be configured to operate the wireless power reception unit 131 when these conditions are satisfied.

Meanwhile, the fueling/charging controller 21 may be configured to determine whether fuel is being supplied using the level sensor within the fuel tank 141 (S601) in response to determining at step S503 that the fuel tank door 111 is open, and may be configured to output a warning that fuel is being supplied (S603) in response to determining that refueling is progressing. In response to determining at step S503 that fuel is not being supplied, the fueling/charging controller 21 may be configured to output a warning that the fuel tank door 111 is open (S605). Accordingly, the driver may be warned that the fuel tank door 111 is open although refueling is not progressing. Additionally, in response to determining at step S503 that the wireless power reception unit 131 is operating, the fueling/charging controller 21 may be configured to output a warning that the wireless charging is progressing by the operation of the wireless power reception unit 131 (S607) before the input of the wireless charging switch 105 is generated.

According to the exemplary embodiment of the present invention as described above, in a vehicle that is supplied with fuel and uses a wireless charging method, when a user generates an input to refuel or to charge a battery, the operations related to the process for refueling and wireless charging, may be detected before the corresponding process is started, whereby it may be possible to prevent a dangerous situation in which refueling is performed simultaneously with the wireless charging.

Wired and Wireless Charging Methods Combined

Figure 4:
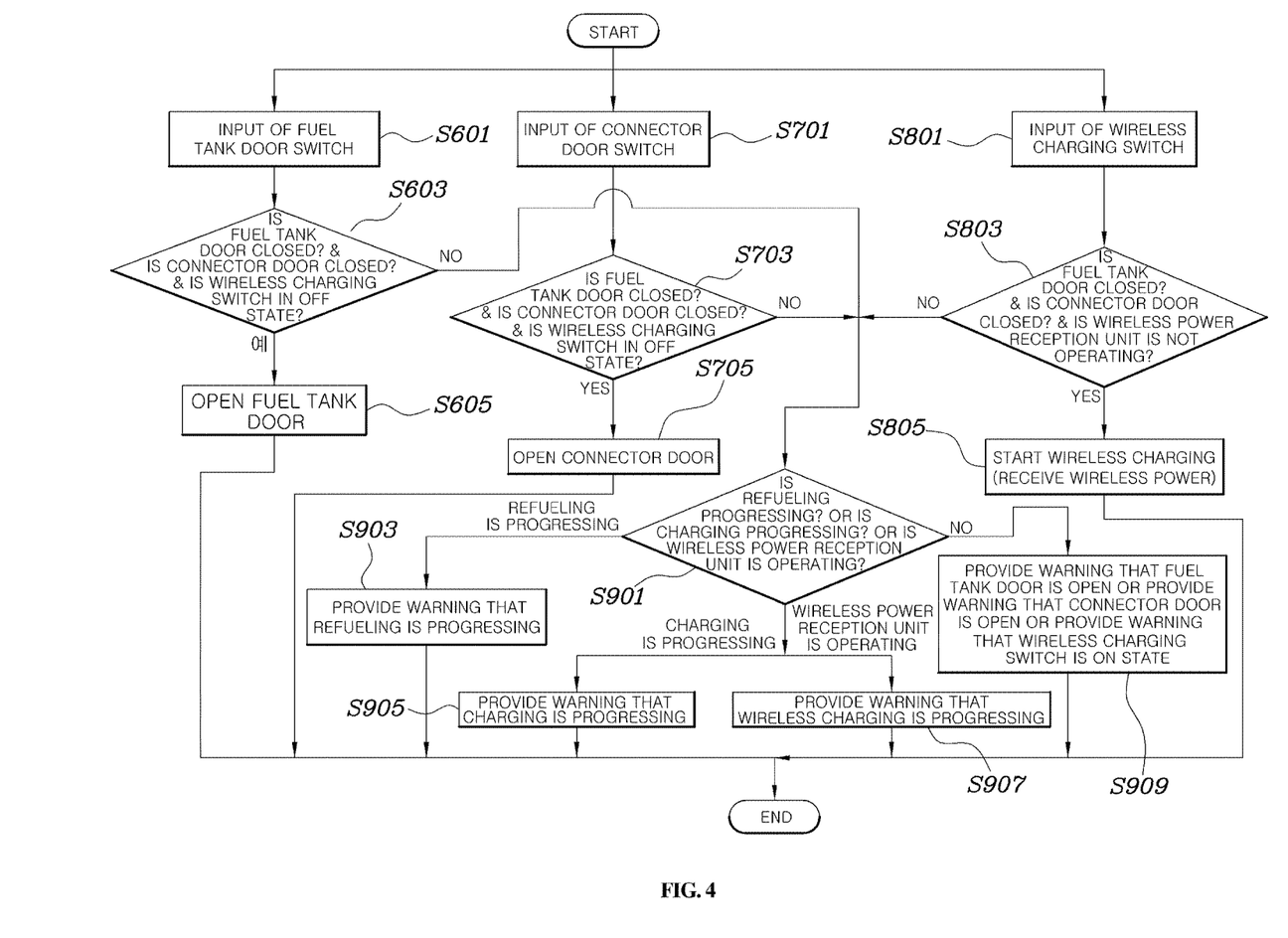
FIG. 4 is a flowchart illustrating the system for managing refueling and charging of a plug-in hybrid vehicle according to an exemplary embodiment of the present invention applied to a vehicle using wired and wireless charging methods.

FIG. 4 is a flowchart illustrating the system for managing refueling and charging of a plug-in hybrid vehicle according to an exemplary embodiment of the present invention applied to a vehicle using wired and wireless charging methods. In the exemplary embodiment of FIG. 4, the input unit may include a fuel tank door switch 101, configured to receive an instruction for opening a fuel tank door, a cable charging connector door switch 103, configured to receive an instruction for opening a cable charging connector door to connect a power cable for supplying power to a battery, and a wireless charging switch 105, configured to receive an instruction for starting the operation of a wireless power reception unit 131 to wirelessly charge the battery.

First, when an instruction is input from the fuel tank door switch 101 (S601), the fueling/charging controller 21 may be configured to determine the input state of the wireless charging switch 105 and whether a fuel tank door 111 and the cable charging connector door 113 are open (S603). Next, in response to determining at step S603 that neither the fuel tank door 111 nor the cable charging connector door 113 is open and that the wireless charging switch 105 is in OFF state, the fueling/charging controller 21 may be configured to open the fuel tank door 111 (S605) to enable refueling.

Meanwhile, the fueling/charging controller 21 may be configured to determine whether fuel is being supplied using a level sensor within a fuel tank 141 (S901) in response to determining at step S603 that the fuel tank door 111 is open, and may be configured to output a warning that fuel is being supplied (S903) in response to determining that refueling is progressing. Particularly, in response to determining at step S901 that fuel is not being supplied, the fueling/charging controller 21 may be configured to output a warning that the fuel tank door 111 is open (S909) to warn a driver that the fuel tank door 111 is open before the driver generates an input via the fuel tank door switch 101.

Additionally, the fueling/charging controller 21 may be configured to determine whether a high-voltage battery 121 is being charged using a battery management system 123 (S901) in response to determining at step S603 that the cable charging connector door 113 is open, and may be configured to output a warning that the battery charging is progressing (S905) in response to determining that the battery is being charged. Particularly, in response to determining at step S901 that the battery 121 is not being charged, the fueling/ charging controller 21 may be configured to output a warning that the cable charging connector door 113 is open (S909). Accordingly, the driver may be warned that the cable charging connector door 113 is open although the charging is not progressing.

Further, the fueling/charging controller 21 may be configured to determine whether the wireless power reception unit 131 is operating (S901) in response to determining at step 603 that the wireless charging switch 105 is in ON state, and may be configured to output a warning that the wireless charging is progressing (S907) in response to determining that the wireless power reception unit 131 is operating. Particularly, in response to determining at step S901 that the wireless power reception unit 131 is not operating, the fueling/charging controller 21 may be configured to output a warning that the wireless charging switch 105 is in ON state (S909). Accordingly, the driver may be warned that the wireless charging switch 105 is in ON state although the wireless charging is not progressing.

When an instruction is input from the cable charging connector door switch 103 (S701), the fueling/charging controller 21 may be configured to determine whether the fuel tank door 111 and the cable charging connector door are open (S703). In response to determining at step S703 that neither the fuel tank door 111 nor the cable charging connector door 113 is open and that the wireless charging switch 105 is in OFF state, the fueling/charging controller 21 may be configured to open the cable charging connector door 113 (S705) to connect the power cable to the cable charging connector.

Meanwhile, the fueling/charging controller 21 may be configured to determine whether fuel is being supplied using the level sensor within the fuel tank 141 (S901) in response to determining at step S703 that the fuel tank door 111 is open, and may be configured to output a warning that fuel is being supplied (S903) in response to determining that refueling is progressing. Particularly, in response to determining at step S901 that refueling is not progressing, the fueling/charging controller 21 may be configured to output a warning that the fuel tank door 111 is open (S909). Accordingly, the driver may be warned that the fuel tank door 111 is open although refueling is not progressing.

Additionally, the fueling/charging controller 21 may be configured to determine whether the high-voltage battery 121 is being charged using the battery management system 123 (S901) in response to determining at step S703 that the cable charging connector door 113 is open, and may be configured to output a warning that the battery is being charged (S905) in response to determining that the battery charging is progressing. In response to determining at step S901 that the battery 121 is not being charged, the fueling/ charging controller 21 may be configured to output a warning that the cable charging connector door 113 is open (S909) to warn the driver that the cable charging connector door 113 is open before the driver generates an input via the cable charging connector door switch 103 for a wired charging process.

Further, the fueling/charging controller 21 may be configured to determine whether the wireless power reception unit 131 is operating (S901) in response to determining at step S703 that the wireless charging switch 105 is in ON state, and may be configured to output a warning that the wireless charging is progressing (S907) in response to determining that the wireless power reception unit 131 is operating. Particularly, in response to determining at step S901 that the wireless power reception unit 131 is not operating, the fueling/charging controller 21 may be configured to output a warning that the wireless charging switch 105 is in ON state (S909). Accordingly, the driver may be warned that the wireless charging switch 105 is in ON state although the wireless charging is not progressing.

When an instruction is input from the wireless charging switch 105 (S801), the fueling/charging controller 21 may be configured to determine whether the fuel tank door 111 and the cable charging connector door 113 are open and whether the wireless power reception unit 131 is operating (S803). In response to determining at step S803 that neither the fuel tank door 111 nor the cable charging connector door 113 is open and that the wireless power reception unit 131 is not operating, the fueling/charging controller 21 may be configured to operate the wireless power reception unit 131 to start (S805). In other words, the fueling/charging controller 21 may be configured to operate the wireless charging control module 133 to determine whether various conditions (e.g., the fuel tank door 111 and the cable charging connector door 113 not open and the wireless power reception unit 131 not operating) for wireless charging are satisfied, and may be configured to operate the wireless power reception unit 131 when these conditions are satisfied.

Meanwhile, the fueling/charging controller 21 may be configured to determine whether fuel is being supplied using the level sensor within the fuel tank 141 (S901) in response to determining at step S803 that the fuel tank door 111 is open, and may be configured to output a warning that fuel is being supplied (S903) in response to determining that refueling is progressing. Particularly, in response to determining that refueling is not progressing, the fueling/charging controller 21 may be configured to output a warning that the fuel tank door 111 is open (S909). Accordingly, the driver may be warned that the fuel tank door 111 is open although refueling is not progressing.

Additionally, the fueling/charging controller 21 may be configured to determine whether the high-voltage battery 121 is being charged (S901) using the battery management system 123 in response to determining at step S803 that the cable charging connector door 113 is open, and may be configured to output a warning that battery charging is progressing (S905) in response to determining that the battery is being charged. Particularly, in response to determining at step S803 that the battery 121 is not being charged, the fueling/charging controller 21 may be configured to output a warning that the cable charging connector door 113 is open (S909). Accordingly, the driver may be warned that the cable charging connector door 113 is open although the battery charging is not progressing. Also, when it is determined at step S803 that the wireless power reception unit 131 is operating, the fueling/charging controller 21 may be configured to output a warning that the wireless charging is progressing by the operation of the wireless power reception unit 131 (S907) before the input of the wireless charging switch 105 is generated.

According to the exemplary embodiment of the present invention as described above, in a vehicle that is supplied with fuel and uses wired and wireless charging methods, when a user generates an input for refueling, wired charging, or wireless charging, the operations related to the process for refueling, wired charging, and wireless charging, may be detected before the corresponding process is started, whereby it may be possible to prevent a dangerous situation in which two processes of the refueling, wired charging, and wireless charging are performed simultaneously.

As described above, the various exemplary embodiments of the present invention may prevent accidents such as fire or explosion attributable to gas fumes, which may be generated during refueling, and static electricity while charging a battery, by preventing refueling and charging of a plug-in hybrid vehicle from being performed simultaneously. Particularly, after a driver generates an input for starting refueling or charging of a battery, various environment conditions and other conditions related to refueling and charging may be detected, whereby performing refueling and charging of the battery simultaneously may be more completely prevented. Additionally, to prevent charging from being performed simultaneously with refueling may be applied to vehicles that use a wired charging method through power cables and also vehicles that use a wireless charging method and vehicles that use a combination of wired and wireless charging methods.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A system for managing refueling and charging of a plug-in hybrid vehicle, comprising:
   a plurality of input units configured to respectively receive an instruction for refueling and an instruction for charging a battery; and
   a fueling/charging controller configured to determine whether a process for refueling and a process for charging the battery are progressing in response to receiving an input instruction from any one of the plurality of input units, and to start a process that corresponds to the instruction input from any one of the plurality of input units, when neither the process for refueling nor the process for charging the battery is progressing,
   wherein the input units include a first input unit configured to receive an instruction for opening a fuel tank door and a second input unit configured to receive an instruction for starting an operation of a wireless power reception unit, which is wirelessly supplied with battery charging power, and
   wherein the wireless power reception unit includes a secondary coil configured to convert a signal transmitted as a form of a magnetic field into an electric signal and multiple circuits configured to convert the power induced by the secondary coil.

2. The system of claim 1, wherein the fueling/charging controller is configured to output a warning that the process for refueling and the process for charging the battery are progressing in response to determining that the process for refueling or the process for charging the battery are progressing.

3. The system of claim 1, wherein the fueling/charging controller is configured to determine whether the fuel tank door is open and detect an input state of the second input unit, when an instruction is input from the first input unit; and to open the fuel tank door in response to determining that the fuel tank door is not open and that an input is not generated in the second input unit.

4. The system of claim 1, wherein the fueling/charging controller is configured to determine whether the fuel tank door is open and whether the wireless power reception unit is operating, when an instruction is input from the second input unit and to start the wireless power reception unit is response to determining that the fuel tank door is not open and that the wireless power reception unit is not operating.

5. The system of claim 1, wherein the fueling/charging controller is configured to:
   determine whether the fuel tank door is open and detect an input state of the second input unit, when an instruction is input from the first input unit;
   determine whether fuel is being supplied in response to determining that the fuel tank door is open; and
   determine whether the wireless power reception unit is operating in response to determining that an input is generated in the second input unit.

6. The system of claim 5, wherein the fueling/charging controller is configured to output a warning that fuel is being supplied in response to determining that fuel is being supplied, and output a warning that the fuel tank door is open in response to determining that fuel is not being supplied.

7. The system of claim 5, wherein the fueling/charging controller is configured to output a warning that the battery is being wirelessly charged in response to determining that the wireless power reception unit is operating, and output a warning that an input is generated in the second input unit in response to determining that the wireless power reception unit is not operating.

8. The system of claim 1, wherein the fueling/charging controller is configured to:
  determine whether the fuel tank door is open and whether the wireless power reception unit is operating, when an instruction is input from the second input unit;
  determine whether fuel is being supplied in response to determining that the fuel tank door is open;
  output a warning that fuel is being supplied in response to determining that fuel is being supplied, and output a warning that the fuel tank door is open in response to determining that fuel is not being supplied; and
  output a warning that the battery is wirelessly being charged when the wireless power reception unit is operating.

9. A system for managing refueling and charging of a plug-in hybrid vehicle, comprising:
  a plurality of input units configured to respectively receive an instruction for refueling and an instruction for charging a battery; and
  a fueling/charging controller configured to determine whether a process for refueling and a process for charging the battery are progressing in response to receiving an input instruction from any one of the plurality of input units, and to start a process that corresponds to the instruction input for charging the batter is progressing,
  wherein the input units include a first input unit configured to receive an instruction for opening a fuel tank door, a second input unit configured to receive an instruction for opening a cable charging connector door to connect a power cable for supplying charging power to the battery, and a third input unit configured to receive an instruction for starting an operation of a wireless power reception unit, which is wirelessly supplied with battery charging power, and
  wherein the wireless power reception unit includes a secondary coil configured to convert a signal transmitted as a form of a magnetic field into an electric signal and multiple circuits configured to convert the power induced by the secondary coil.

10. The system of claim 9, wherein the fueling/charging controller is configured to determine whether the fuel tank door and the cable charging connector door are open and detect an input state of the third input unit, when an instruction is input from the first input unit; and to open the fuel tank door in response to determining that neither the fuel tank door nor the cable charging connector door is open and that an input is not generated in the third input unit.

11. The system of claim 9, wherein the fueling/charging controller is configured to determine whether the fuel tank door and the cable charging connector door are open and detect an input state of the third input unit, when an instruction is input from the second input unit; and to open the cable charging connector door in response to determining that neither the fuel tank door nor the cable charging connector door is open and that an input is not generated in the third input unit.

12. The system of claim 9, wherein the fueling/charging controller is configured to determine whether the fuel tank door and the cable charging connector door are open and whether the wireless power reception unit is operating, when an instruction is input from the third input unit; and to start the wireless power reception unit in response to determining that neither the fuel tank door nor the cable charging connector door is open and that the wireless power reception unit is not operating.

13. The system of claim 9, wherein the fueling/charging controller is configured to:
  determine whether the fuel tank door and the cable charging connector door are open and detect an input state of the third input unit, when an instruction is input from the first input unit;
  determine whether fuel is being supplied in response to determining that the fuel tank door is open;
  determine whether the battery is being charged in response to determining that the cable charging connector door is open; and
  determine whether the wireless power reception unit is operating in response determining that an input is generated in the third input unit.

14. The system of claim 13, wherein the fueling/charging controller is configured to output a warning that fuel is being supplied in response to determining that fuel is being supplied, and output a warning that the fuel tank door is open in response to determining that fuel is not being supplied.

15. The system of claim 13, wherein the fueling/charging controller is configured to:
  output a warning that the battery is being charged in response to determining that the battery is being charged;
  output a warning that the cable charging connector door is open when the battery is not being charged; and
  output a warning that the battery is being wirelessly charged in response to determining that the wireless power reception unit is operating.

16. The system of claim 9, wherein the fueling/charging controller is configured to:
  determine whether the fuel tank door and the cable charging connector door are open and detect an input state of the third input unit, when an instruction is input from the second input unit;
  determine whether fuel is being supplied in response determining that the fuel tank door is open;
  determine whether the battery is being charged in response to determining that the cable charging connector door is open; and
  determine whether the wireless power reception unit is operating when in response to that an input is generated in the third input unit.

17. The system of claim 16, wherein the fueling/charging controller is configured to output a warning that fuel is being supplied in response to determining that fuel is being supplied, and output a warning that the fuel tank door is open in response to determining that fuel is not being supplied.

18. The system of claim 16, wherein the fueling/charging controller is configured to:
  output a warning that the battery is being charged in response to determining that the battery is being charged;
  output a warning that the cable charging connector door is open in response to determining that the battery is not being charged; and output a warning that the battery is wirelessly being charged in response to determining that the wireless power reception unit is operating.

19. The system of claim 9, wherein the fueling/charging controller is configured to:
   determine whether the fuel tank door and the cable charging connector door are open and whether the wireless power reception unit is operating, when an instruction is input from the third input unit;
   determine whether fuel is being supplied in response to determining that the fuel tank door is open, output a warning that fuel is being supplied in response to determining that fuel is being supplied, and output a warning that the fuel tank door is open in response to determining that fuel is not being supplied;
   determine whether the battery is being charged in response to determining that the cable charging connector door is open, and output a warning that the cable charging connector door is open in response to determining that the battery is not being charged; and
   output a warning that the battery is wirelessly being charged in response to determining that the wireless power reception unit is operating.

\* \* \* \* \*